United States Patent [19]

Eiden

[11] 4,336,293
[45] Jun. 22, 1982

[54] ANTI-SLIP MAT

[75] Inventor: Ronald R. Eiden, North St. Paul, Minn.

[73] Assignee: Minnesota Mining and Manufacturing Company, Saint Paul, Minn.

[21] Appl. No.: 238,944

[22] Filed: Feb. 27, 1981

[51] Int. Cl.³ .......................... B32B 3/28; B32B 5/16
[52] U.S. Cl. .................................... 428/143; 156/209; 156/247; 427/203; 428/40; 428/161; 428/213; 428/323; 428/331; 428/424.6
[58] Field of Search .............. 428/161, 156, 172, 141, 428/143, 323, 332, 423.5, 213, 424.6; 156/209, 247; 427/203, 202

[56] References Cited

U.S. PATENT DOCUMENTS

| | | | |
|---|---|---|---|
| 2,975,089 | 3/1961 | Hargreaves | 428/455 |
| 3,016,317 | 1/1962 | Brunner | 428/158 |
| 3,227,604 | 1/1966 | Morgan | 428/40 |
| 3,578,550 | 5/1971 | Hoerner et al. | 428/331 |
| 3,895,153 | 7/1975 | Johnston et al. | 428/141 |
| 4,060,947 | 12/1977 | Naka | 428/67 |
| 4,210,693 | 7/1980 | Regan et al. | 428/172 |
| 4,250,219 | 2/1981 | Pogoda | 428/423.5 |

Primary Examiner—Paul J. Thibodeau
Attorney, Agent, or Firm—Cruzan Alexander; Donald M. Sell; Richard Francis

[57] ABSTRACT

An anti-slip mat is provided having a bottom surface adapted to permit the mat to lie flat on a flat surface and an opposite regularly undulated top surface characterized by having raised portions and depressed portions and being coated with an abrasive, anti-slip layer. A preferred method of forming such a mat includes steps of forming a layer of primer resin on a release liner, coating one surface of the primer resin layer with liquid curable polyurethane adhesive resin, distributing abrasive grain over the polyurethane resin layer while it is still liquid, at least partially curing the polyurethane resin, coating the resultant grain-coated surface with liquid curable polyurethane resin, curing the resultant coating, removing the release liner, forming an embossable sheet of a polymeric composition, contacting one surface of the polymeric sheet with the surface of the primer resin layer opposite the abrasive surface to provide a laminated structure and embossing the laminated structure to provide the mat.

3 Claims, 3 Drawing Figures

ANTI-SLIP MAT

DESCRIPTION

TECHNICAL FIELD

This invention relates to an anti-slip mat especially suited for use on floors in food service and industrial areas where the presence of grease, oil, water and the like may create a slippery, hazardous floor surface. The invention also relates to a method of preparing such a mat.

BACKGROUND ART

A fall caused by a slippery floor surface may provide a humorous sequence in a motion picture or television comedy, but in the real world it has been known to cause serious injury and even death. One of the most common areas where dangerous slippery floor surfaces are present is in commercial kitchens where grease, oil, water and the like commonly spill on the floor. The problem often times is compounded by the fact that personnel working in these areas typically carry containers of hot substances which can provide a secondary source of injury during the fall by being contacted and burned by the hot substance.

Various devices have been employed in the past to reduce or eliminate the slipperiness, but many have generally been only temporarily effective, if effective at all. Other devices have been extremely expensive and have caused additional problems for kitchen personnel. Wood duckboards have been commonly used but are not particularly desirable inasmuch as they are unduly thick and therefore impede the movement of kitchen carts commonly used by kitchen personnel. Additionally, the wood rapidly absorbs the grease and oil and the grease or oil soaked surface of the duckboard itself becomes a hazardous surface. It is also very difficult to remove the grease or oil from a duckboard, once it has been utilized for an extended period of time. Thin non-slip surface covering materials such as that sold by the assignee under the trade designation "Safety Walk" have also been utilized. While this material has met with great commercial success and provides a desirable non-slip surface and it is sufficiently thin to permit the passage of kitchen carts, it requires adhesion to the floor surface to prevent slipping and curling under pedestrian and cart traffic. It is virtually impossible to obtain good long term adhesion between such thin non-slip surface coverings on floor surfaces which have already been exposed to grease and oil due to the penetration of these materials into the floor. Additionally, even after adhesion to a new floor surface, the adhesive generally releases because of penetration of oil, grease and/or other liquids between the adhesive and the floor or by actual penetration into the adhesive layer, if it is susceptible to failure in the presence of the penetrant. Thin non-slip materials of this type are disclosed in U.S. Pat. Nos. 3,578,550 (Hoerner et al), 3,895,153 (Johnston et al) and 3,227,604 (Morgan).

Other non-slip devices have included mats formed of a solid layer of rubber, rubber mats having a molded textured surface, mats made of segments of automobile tires fastened together in a link arrangement to provide openness, vinyl mats having an embossed grid-like top surface, vinyl slat mats with abrasive grit on the upper surface of the slat, and the like. Hargreaves (U.S. Pat. No. 2,975,089) discloses a resilient non-slip mat having deep parallel grooves in its upper surface and being formed of a mixture of rubber and granulated cork.

Naka (U.S. Pat. No. 4,060,947) discloses a non-skid strip having an embossed undulated upper surface. Brunner (U.S. Pat. No. 3,016,317) discloses a resilient gymnastic mat having a grooved sheet of cellular material on its top surface.

DISCLOSURE OF INVENTION

The present invention provides an anti-slip mat especially suited for use on floors in food service and industrial areas where the presence of grease, oil, water and the like may create a slippery hazardous floor surface. The mat includes a shaped backing having a bottom surface adapted to permit the mat to lie flat on a flat surface and an opposite regularly undulated top surface characterized by having raised portions and depressed portions. The portions are shaped to permit liquids on the upper surface of the mat to substantially completely drain from the mat when the mat is laid upon the flat surface. The backing is formed of an oil and water resistant polymeric composition having a tensile strength greater than about $6.9 \times 10^6$ Pa, a modulus of at least 2.1 Pa at 100% elongation and a Shore A durometer of greater than 35. The mat has a thickness in the raised portions on the order of 3 to 13 mm to permit the passage of kitchen and other carts and to not provide a substantial tripping hazard. The difference in thickness between the raised and the depressed portions is at least about 1 mm. Abrasive grains having a grit size on the order of 50-180 (0.3-0.1 mm average diameter) are distributed over and adherently bonded to at least the surface of the raised portions by a polyurethane adhesive resin, preferably applied separately as make and size coatings following known techniques in the coated abrasive art, to provide an abrasive layer on at least the raised portions. The adhesion between the abrasive layer and the backing should provide a 180° tensile strength of at least 5.8 kg per 25 mm width. The make and the size adhesive resins are included in an amount which provides firm adherent bonding of the abrasive grain to the top surface of the mat without obscuring the grain to provide an anti-slip surface. The mat may also include a primer coating of polyamide resin to aid adhesion of the polyurethane resin.

The mat of the invention may be made by first forming the shaped backing as described above, e.g., by molding, embossing, extruding and the like. Liquid curable polyurethane is then applied to at least the raised surface portions, the abrasive grain distributed thereover, and the resin cured.

A preferred mat of the invention is conveniently prepared by:

(a) forming a layer of polyamide primer on a release liner so that the layer of primer has an exposed first major surface and an opposite second major surface which is in contact with the release liner;

(b) coating the first major surface of the layer of polyamide primer with liquid curable polyurethane make adhesive resin capable on curing of forming a strong adherent bond between abrasive grain and the first major surface;

(c) distributing abrasive grain over the make adhesive resin while the make adhesive resin is still liquid;

(d) at least partially curing the make adhesive resin;

(e) coating the grain-coated surface with liquid curable polyurethane size resin capable on curing of forming a strong adherent bond between the abrasive grain and the cured make adhesive resin;

(f) curing said size adhesive resin;

(g) removing the release liner from the opposite second major surface of the primer layer;

(h) forming an embossable sheet of filled plasticized polyvinyl chloride having substantially parallel opposed major surfaces capable on contact of forming an adherent bond with the surface of the primer layer;

(i) contacting one of the opposed major surfaces of the polyvinyl chloride sheet with the opposite second major surface of the primer layer to provide a laminated structure; and (j) embossing the laminated structure to provide therein a bottom surface adapted to permit the laminated structure to lay flat on a flat surface and an opposite undulated top surface characterized by having raised portions and depressed portions as described above.

BRIEF DESCRIPTION OF THE DRAWINGS

An example of the mat according to the present invention is illustrated in the accompanying drawing in which.

BEST MODE FOR CARRYING OUT THE INVENTION

Figure 1:
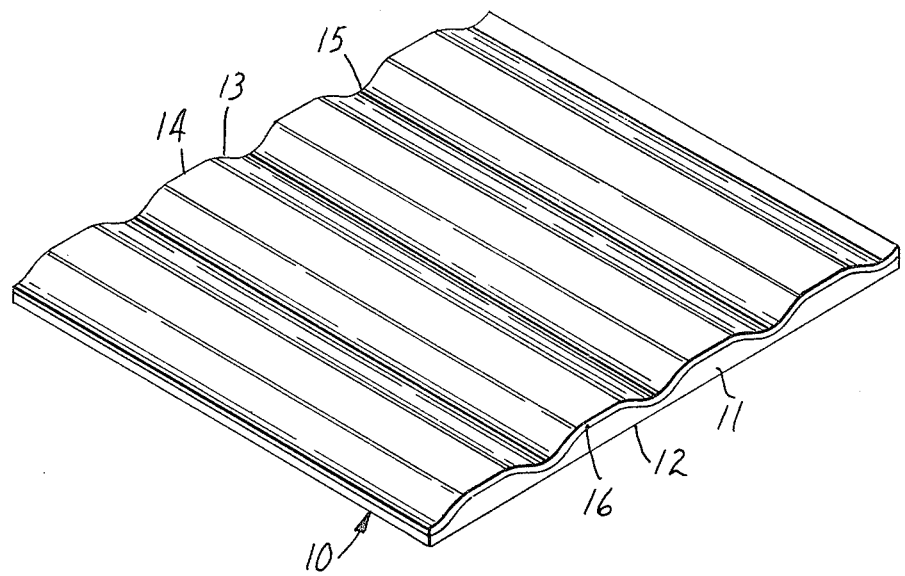
FIG. 1 is a perspective view of the mat when viewed from above.
Figure 2:
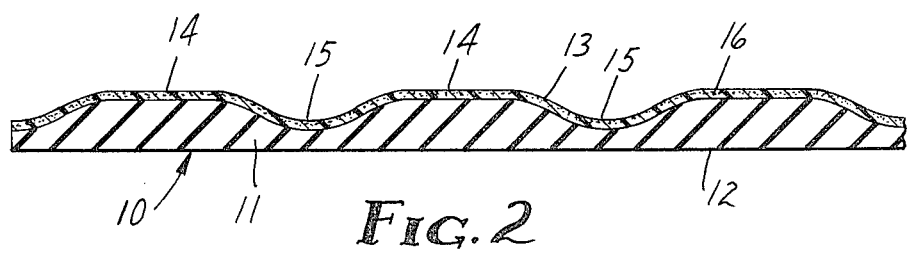
FIG. 2 is a cross sectional view of the mat of FIG. 1 at an enlarged scale.

Referring to FIGS. 1 and 2, mat 10 includes a backing 11 having a bottom surface 12 adapted to permit mat 10 to lay flat on a flat surface and an opposite regularly undulated anti-slip upper surface 13 characterized by having raised portions 14 and depressed portions 15. Raised portions 14 and depressed portions 15 are shaped to permit liquids on upper surface 13 to substantially drain when the mat is laid upon a flat surface such as a floor. Backing 11 is preferably formed of oil and water resistant filled plasticized polyvinyl chloride composition.

At least raised portions 14 are coated with abrasive layer 16 preferably formed of a polyamide primer coating which is make coated with a polyether polyurethane adhesive resin which adherently bonds abrasive grit thereon and size coated with a polyether polyurethane size resin to provide an anti-slip surface 13.

Figure 3:
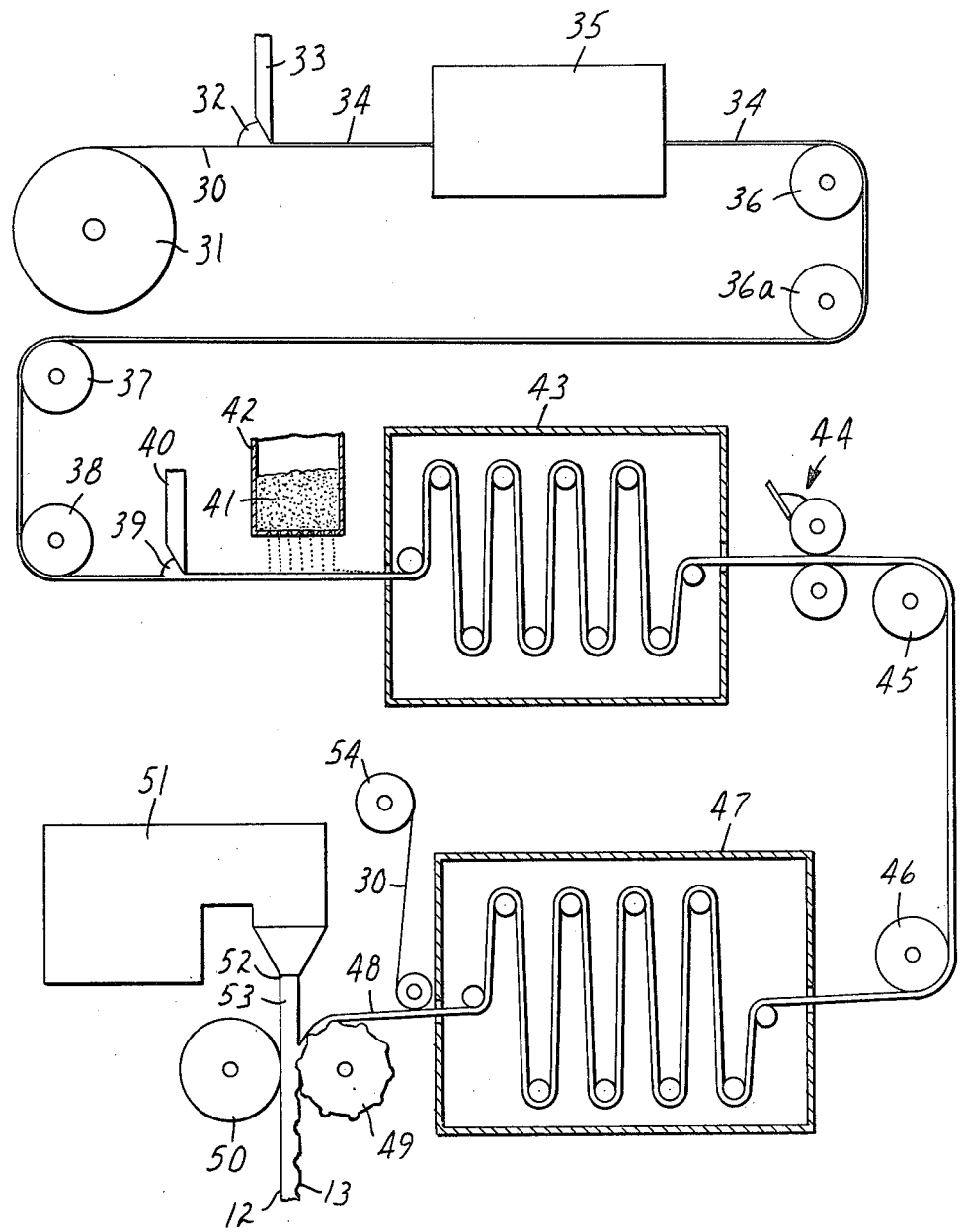
FIG. 3 is a schematic view of apparatus and the process utilized in producing the mat of FIG. 1.

As depicted in FIG. 3, the preferred mat of the invention may conveniently be prepared by first coating release liner 30 obtained from storage roll 31 with primer composition 32 by conventional coating techniques, e.g., knife coater 33, to provide coated release liner 34. The coating is then cured by heating in curing oven 35. The coated web 34 is then passed over idler rolls 36, 36a, 37 and 38 and then coated with make resin composition 39, by a conventional coating technique, e.g., knife coater 40. Thereafter, abrasive grit 41 is applied in a conventional manner, e.g., by cascade coating device 42 and the abrasive grit-coated web is passed through drying oven 43 which preferably has a festooning drying arrangement having a series of idler rolls which permits the web to be undulated to provide a longer residence time to at least partially cure the make resin. Thereafter, the web is coated with size adhesive resin by a conventional coating technique upon grit-coated surface, e.g., by roll coater 44, and thereafter passed over idler rolls 45 and 46 into drying oven 47 which may also be adapted for festoon drying. Release liner 30 is then removed and may be stored on storage roller 54. Resultant web 48 is then passed between embossing roll 49 and back up roll 50 while simultaneously providing a sheet of molten filled plasticized polyvinyl chloride from extruder 51 through a sheet-producing extrusion orifice 52 and the molten filled plasticized polyvinyl chloride sheet and abrasive coated web 48 are simultaneously urged between rolls 49 and 50. Roll 49 has an embossing surface capable of producing raised portions and depressed portions in the resultant embossed laminate and is positioned with respect to back up roll 50 to provide the desired configuration in the laminate. Molten vinyl sheet 53 is conformed between embossing roll 49 and back up roll 50 to provide undulated surface 13 and bottom surface 12 capable of permitting the resultant laminate to lie flat on a flat surface. Segments of the mat may then be cut from the laminate in a conventional commercial size.

The backing is formed of a polymeric composition having an inherent tensile strength greater than about 6.9 Pa, a modulus of at least 2.1 Pa at 100% elongation and a Shore A durometer greater than about 35 and less than about 100. The preferred Shore A durometer range is from 65 to 85. Suitable backings may be formed of polymeric materials such as cured natural rubber and synthetic elastomeric polymeric materials such as plasticized polyvinyl chloride, polyurethane, and the like.

The backing is preferably formed of medium molecular weight plasticized polyvinyl chloride resin filled with inorganic fillers such as calcium carbonate and the like. A preferred backing formulation comprises 100 parts medium molecular weight polyvinyl chloride resin suspension, 2.5 parts by weight phosphite chelating agent, 50 parts by weight calcium carbonate filler, 4 parts by weight antimony oxide, 10 parts by weight epoxidized soy bean oil plasticizer such as that available under the trade designation "Peroxidol" 780, 45 parts by weight polymeric phthalate plasticizer such as that sold under the trade designation "Santicizer" 429 and 20 parts by weight dioctoyl phthalate plasticizer such as that available under the trade designation "Santicizer" 711.

The backing has a thickness in the raised portions on the order of 3 to 13 mm thick. At less than 3 mm thick, the mat tends to curl and at greater than 13 mm thick the mat may provide an obstruction to carts and may also provide a tripping hazard. The difference in thickness between the raised and the depressed portions is at least 1 mm. Preferably, the difference in thickness is on the order of 1.3 to 2.0 mm.

A cross sectional view of the preferred undulated top surface of the mat will be in the form of sine wave having blunt (preferably flat-topped) wave peaks and rounded valleys to provide a repeating series of blunt parallel raised portions separated by parallel depressions. The preferred wave frequency of the sine wave is 13 mm per half wave or 25 mm from peak center to peak center in adjacent waves.

The preferred prime coating material is a polyamide hot melt adhesive resin available under the trade designation "Macro Melt" 6240 (available from Henkel, Inc.). In use, this resin is utilized in a 20 percent solids solution of a 1:1 mixture by volume of isopropyl alcohol and tolulene.

The preferred release liner is silicone coated Kraft paper having a thickness of approximately 0.025 mm. Other useful release liners may also be employed.

The preferred polyurethane make and size resin is a polytetramethylene ether glycol/tolylene diisocyanate ketoxime blocked prepolymer resin, preferably employed in a coating composition comprising 100 parts by weight of the ketoxime blocked prepolymer resin (commercially available as "Adiprene" BL 16 from E. I. DuPont), 32 parts by weight methylene dianiline solution (35% by weight methylene dianiline and 65% by weight "Cellulose" acetate) and 2 parts by weight N-(-2-aminoethyl)-3-aminopropyl trimethoxy silane available from the Dow Corning Company under the trade designation "EZ 6020".

The abrasive grit should be 180 grade (0.1 mm average particle size) or larger to provide a sufficient abrasive surface, even when covered with oil or grease. An abrasive grit preferably is not larger than 50 grade (0.3 mm average particle size) to avoid unnecessary shoe wear which may occur at the large sizes. The abrasive grit may be any durable, crush-resistant abrasive material capable of withstanding the use conditions contemplated herein. The preferred abrasive minerals include silicon carbide and alumina.

The coating steps described with respect to the method and apparatus described above may be accomplished with any conventional coating equipment suited for this purpose. The initial coating of the primer on the release liner may be accomplished by the use of roll coating, spray coating, knife coating, curtain coating or similar techniques. The make coating may be applied in the same manner. The size may utilize roll coating, spray coating, curtain coating but preferably not knife coating due to the abrasiveness and roughness of the surface because of the presence of the abrasive grit.

The extruder for forming the molten plasticized polyvinyl chloride filled composition sheet may be any known equipment suited for this purpose. The extrusion die, as previously discussed, is capable of forming a continuous sheet of the molten material. The embossing roll preferably is formed of metal and may be heated to maintain flowable consistency of the polyvinyl chloride composition during embossing.

The invention is further illustrated by the following examples wherein all parts are by weight unless otherwise designated.

EXAMPLE 1

A 20% solids solution of polyamide resin available under the trade designation "Macro Melt" 6240 (commercially available from Henkel, Inc.) in a 50:50 mixture of isopropyl alcohol and toluene was knife coated onto a silicone-impregnated Kraft paper release liner and was dried in a warm air oven at 65° C. to provide a dry polyamide coating weight of 27 g per m². The primer surface was then coated with a make resin coating composition consisting of 100 parts by weight polytetramethylene ether glycol/tolylene diisocyanate-ketoxime blocked prepolymer (sold under the trade designation "Adiprene" BL 16) 32 parts by weight of a 35% solids solution of methylene diamine in "Cellosolve" acetate and 2 parts by weight N-(2-aminoethyl)-3-aminopropyl trimethoxy silane available under the trade designation "EX" 6020 from Dow Corning Chemical Co. The make coating composition was roll coated onto the primer to provide a dry weight of 75 g per m². While the coating composition was still wet, 100 grit (average particle size 0.15 mm) alumina abrasive grain was drop coated to provide a uniform distribution of abrasive grain and an add on weight of 460 g per m². The abrasive-coated resultant combination was then partially cured in an oven heated at 120° C. for 30 minutes in a festooned arrangement. A size resin coating composition (the same as the make resin coating composition) was applied over the abrasive grain to provide a dry coating weight of 100 g per m² and the resultant sized combination was dried in an air oven at 130° C. in a festooned arrangement to provide a residence time of 4 hours.

The release liner was removed from the resultant abrasive-coated sheet and the abrasive-containing web was passed over an embossing roll heated at 65° C. and having a surface capable of producing the pattern shown in FIGS. 1 and 2 while simultaneously extruding a molten sheet of filled plasticized polyvinyl chloride from an extruder at a melt temperature of 175°–195° C. through an extruder opening of 4.6 mm. The plasticized polyvinyl chloride sheet and the abrasive sheet were contacted as shown in FIG. 3 and passed through the embossing nip while maintaining a minimum roll to roll pressure of $2.1 \times 10^5$ Pa and maintaining a 4.6 mm gap between rolls (measured between the raised portion and the back up roll) to produce a finished product 4.7 mm thick (measured from the bottom to the top of the raised portion) which weighed about 4.9 kg per m². The filled plasticized polyvinyl chloride composition consisted of the following ingredients:

| Ingredients | Parts by Weight |
| --- | --- |
| Medium molecular weight suspension grade polyvinyl chloride resin | 100.0 |
| Barium-cadmium zinc stabilizer available under the trade designation "Mark" OHM (Argus Chemical Co.) | 2.5 |
| Phosphite chelating agent available under the trade designation "Mark" C (Argus Chemical Co.) | 0.2 |
| Calcium carbonate filler | 50.0 |
| Antimony oxide | 4.0 |
| Epoxidized soy bean oil plasticizer available under the trade designation "Peroxidol" 780 | 10.0 |
| Polymeric phthalate plasticizer sold under the trade designation "Santicizer" 429 (Monsanto) | 45.0 |
| Di-octyl phthalate plasticizer available under the trade designation "Santicizer" 711 (Monsanto) | 20.0 |

The resultant abrasive-surfaced mat had a back side which conformed to a flat surface and an upper surface similar to that depicted in FIG. 1 which provided an excellent anti-slip surface and good drainage.

EXAMPLE 2

A flexible rubber sheet, 5 mm thick, was made by extruding at 190° C. ethylene, propylene, non-conjugated diene terpolymer available under the trade designation "Nordel 1070" from the E. I. DuPont Company. The sheet was then coated with an adhesive composition consisting of 100 parts polytetramethylene ether glycol/tolyene di-isocyanate-ketoxime blocked prepolymer available under the trade designation "Adiprene" BL-16 from E. I. DuPont Company, 32 parts by weight of a 35% solids solution of methylene dianiline in "Cellosolve" acetate and 2 parts N-(2-aminoethyl)-3- aminopropyl trimethoxy silane available under the trade designation of "EZ" 6020 (Dow Corning Co.) to provide a make coat dry add-on weight of 42 g per m². While the coating composition was still wet, 100 grit alumina abrasive grain (0.15 mm average particle size) was drop coated to provide a uniform distribution of abrasive grain with an add-on weight of 460 g per m². While still uncured, a vacuum system was used to remove unattached mineral. The resulting composite was then size coated by spray coating with the same adhesive composition and then cured at 125° C. in an oven for 4 hours to provide a dry coating weight of 100 g per m². The resultant mat was flexible with a durably adhered antislip abrasive coating.

EXAMPLE 3

A molded sheet of clay-filled polyether urethane was formed by casting the two part urethane composition described below into a mold having a cavity capable of producing a 4.6 mm thick sheet having 13×13 mm, 1.3 mm thick protrusions having textured upper surfaces and being spaced 13 mm apart to provide an upper surface having substantially parallel opposed major raised surfaces for drainage and anti-slip. The raised surfaces were then make coated with an adhesive composition consisting of 100 parts polytetramethylene ether glycol/tolylene diisocyanate prepolymer (available under the trade designation "Adiprene" L 167, and 32 parts by weight of sodium chloride blocked methylene di-aniline in di-octyl phthalate plasticizer (available under the trade designation "Caytur" 21 from the E. I. DuPont Co.) to provide a dry add-on weight of 80 g per m² (0.5 mm average particle size). While the make coating composition was still wet, 100 grit alumina oxide abrasive grain was drop coated onto the mat to provide a uniform distribution of abrasive grain and an add-on weight of 460 g per m². While still uncured an air wand was used to blow excess unbonded mineral from the mat surface. The resulting composition was then size coated by spray coating the adhesive described in Example 2 and the resultant coating was cured at 130° C. in an oven for 4 hours. The 180° peel strength of adhesive and abrasive layers from the backing was 9.3 kg per 25 mm width, with cohesive failure of adhesive and abrasive layer.

| Filled Polyurethane Composition | Parts by Weight |
|---|---|
| Part A | |
| poly(oxypropylene)diol having a 2000 MW | 29.65 |
| calcium octate available under the trade designation "Hexogen Calcium" | .30 |
| poly(oxypropylene) triol having a 3000 MW | 24.10 |
| 2(2'-hydroxy-5'-methylphenyl)benzotriazole | |

| Filled Polyurethane Composition | Parts by Weight |
|---|---|
| stabilizer available under the trade designation "Tinuvin P" (Ciba-Geigy Corp.) | .10 |
| clay filler available under the trade designation "Huber Hi-White" clay | 45.45 |
| butylated hydroxy toluene | .40 |
| Part B | |
| diphenylmethane diisocyanate | 86.4 |
| tripropylene glycol | 7.8 |
| polypropylene glycol having a 2000 MW available under the trade designation "PPG" 2025 diol from Union Carbide Corp. | 5.5 |

I claim:
1. An anti-slip mat especially suited for use on floors in food service and industrial areas where the presence of grease, oil, water and the like may create a slippery, hazardous floor surface, said mat comprising:
(a) a shaped backing having a bottom surface adapted to permit the mat to lay flat on a flat surface and an opposite regularly undulated top surface characterized by having raised portions and depressed portions, said portions being shaped to permit liquids on said upper surface to substantially completely drain from said top surface when said mat is laid upon a flat surface, said backing being formed of an oil and water resistant polymeric composition having an inherent tensile strength greater than about 6.9 Pa, a modulus of at least 2.1 Pa at 100% elongation and a Shore A durometer of greater than 35 and having a thickness in said raised portions on the order of 3 to 13 mm and a difference of thickness between the raised and depressed portions of at least 1 mm;
(b) a polyurethane make adhesive resin adherently bonded to at least said raised portions of said backing;
(c) abrasive grains having a grit size on the order of 50–180 (0.3 to 0.1 mm average particle size) distributed over and adherently bonded by said make resin; and
(d) a polyurethane adhesive size resin covering said abrasive grain and said make adhesive resin, said make and size adhesive resins being included in the amount which provides firm adherent bonding of said abrasive grain to said top surface without obscuring the said grain whereby to provide an anti-slip surface and providing an abrasive layer which is adherently bonded to the upper surface of said backing to provide a 180° tensile strength between said abrasive layer and the backing of at least 5.8 kg per 25 mm width.
2. The anti-slip mat of claim 1 also including a polyamide primer layer between said polyurethane make adhesive resin and said backing.
3. The anti-slip mat of claim 1 wherein said polymeric composition is filled plasticized polyvinyl chloride.

* * * * *